United States Patent [19]

Crofts

[11] 4,427,725

[45] Jan. 24, 1984

[54] DIMENSIONALLY-RECOVERABLE ARTICLE

[75] Inventor: David Crofts, Cirencester, England

[73] Assignee: Raychem Limited, London, England

[21] Appl. No.: 347,828

[22] Filed: Feb. 11, 1982

[51] Int. Cl.³ .................... B32B 33/00; B32B 31/00; B32B 1/08

[52] U.S. Cl. ................................. 428/36; 428/332; 428/447; 428/494; 428/516; 428/347; 428/349; 428/913; 156/86

[58] Field of Search ............... 428/36, 332, 447, 494, 428/516, 347

[56] References Cited

U.S. PATENT DOCUMENTS

| | | | |
|---|---|---|---|
| 2,027,962 | 3/1933 | Currie | 264/230 |
| 4,232,712 | 11/1980 | Squires | 428/36 |
| 4,241,119 | 12/1980 | Smart | 428/36 |
| 4,300,970 | 11/1981 | Honda et al. | 428/494 |

FOREIGN PATENT DOCUMENTS

| | | |
|---|---|---|
| 990235 | 4/1965 | United Kingdom . |
| 1284082 | 8/1972 | United Kingdom . |
| 1294665 | 11/1972 | United Kingdom . |
| 2019412 | 4/1979 | United Kingdom . |
| 1603205 | 11/1981 | United Kingdom . |
| 2077919 | 12/1981 | United Kingdom . |
| 2046127 | 5/1983 | United Kingdom . |

OTHER PUBLICATIONS

UK Application #37,468/78-Paul Tamplin and Norman Hutt.

*Primary Examiner*—P. Ives
*Attorney, Agent, or Firm*—Edith A. Rice; Herbert G. Burkard

[57] ABSTRACT

A polymeric article, at least part of which is dimensionally-recoverable, preferably heat-recoverable, has, bonded to the surface of a dimensionally-recoverable portion thereof, a pliant, adhesive-receptive polymeric film which is soft at the temperature at which the dimensionally-recoverable portion is recovered, and which is substantially non-curable at ambient temperatures. The polymeric film is preferably based on a film-forming chlorinated resin or a film forming silane.

The articles may be recovered over objects such as electrical equipment to provide electrical insulation and may be bonded to the object or other article with an adhesive without the necessity of any special surface treatment immediately before bonding.

17 Claims, 2 Drawing Figures

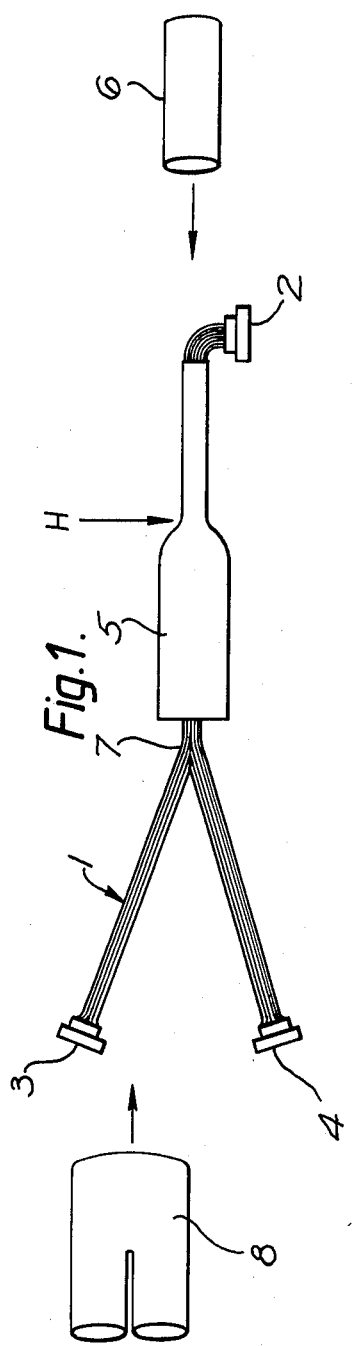
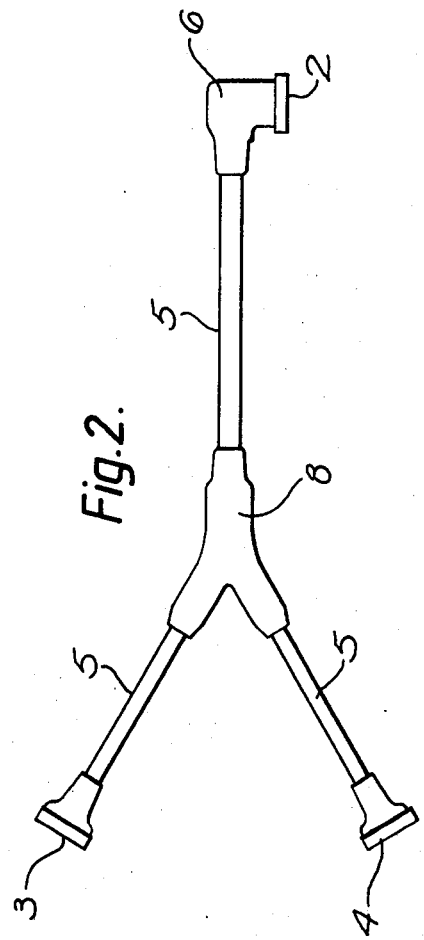

DIMENSIONALLY-RECOVERABLE ARTICLE

This invention relates to dimensionally-recoverable articles, and especially to dimensionally-recoverable articles that are used for electrical insulation and/or mechanical protection of, for example, electrical equipment. One important application of such articles is for protection of equipment such as wires and cables, splices therein, electrical connectors and harnesses, from mechanical abuse or chemical attack.

Dimensionally recoverable articles are articles, the dimensional configuration of which may be made substantially to change by the appropriate treatment. Of particular importance are articles that are dimensionally heat-recoverable. Heat-recoverable articles may, for example, be produced by deforming a dimensionally heat-stable configuration to a dimensionally heat-unstable configuration, in which case the article will assume, or tend to assume, the original heat-stable configuration on the application of heat alone.

According to one method of producing a heat-recoverable article, a polymeric material is first extruded or moulded into a desired shape. The polymeric material is then cross-linked or given the properties of a cross-linked material by means of chemical cross-linking initiators or by exposure to high energy radiation, for example a high energy electron beam or gamma radiation. The cross-linked polymeric material is heated and deformed and then locked in the deformed condition by quenching or other suitable cooling methods. The deformed material will retain its shape almost indefinitely until exposed to a temperature above its crystalline melting temperature, for example about 120° C. in the case of low density polyethylene. Examples of heat-recoverable articles may be found in U.S. Pat. No. 2,027,962 and U.K. Patent Specification No. 990,235, the disclosures of which are incorporated herein by reference. As is made clear in U.S. Pat. No. 2,027,962, however, the original dimensionally stable heat-stable configuration may be a transient form in a continuous process in which, for example an extruded tube is expanded, while hot, to a dimensionally heat unstable form.

Articles of this type to be used for the protection of electrical equipment may be formed in a number of configurations. For example they may be extruded in the form of tubes and expanded pneumatically, or they may be formed, by injection, compression or transfer moulding processes and expanded manually by means of mandrels, the moulding processes being used to form boots, udders (a term employed in a general sense to include any hollow heat-shrinkable article comprising a plurality of open-ended legs employed to cover branches in electrical cables and commonly referred to as "breakouts" or "transitions"), end-caps and the like.

Often, the article must be bonded to one or more other objects when recovered onto the equipment or after recovery. For example, when an electrical harness is to be protected, heat-shrinkable tubing is recovered over the wires and then one or more moulded articles are recovered onto other parts of the harness so that they overlie, and are bonded to, part of the tubing. In order to provide an effective seal against fluid ingress, especially where the bond will be subjected to mechanical forces, a high-performance adhesive must be used to form the bond, and it is usual in these cases for an epoxy adhesive, especially a multi-component epoxy adhesive to be used. In many instances, however, the quality of such bonds falls below an acceptable level and may allow failure of the bond under normal working conditions. In fact, we have found that when such articles are recovered and bonded together by the customer during production of harnesses, the bond strengths obtained may be as low as 20% of the bond strengths obtained when the articles are recovered and bonded under controlled conditions. In addition, because the only reliable tests for determining the quality of the bond require causing the bond to fail (destructive testing), many defective bonds may be passed by standard production quality control tests.

The present invention provides a polymeric article, at least part of which is dimensionally-recoverable, and has, bonded to the surface of a dimensionally-recoverable portion thereof, a pliant, adhesive-receptive polymeric film which is soft at the temperature at which the dimensionally-recoverable portion is recovered, and which is substantially non-curable at ambient temperatures.

In most applications, and especially where the article is to be used in the production of electrical harnessing, any dimensionally-recoverable portion will be dimensionally heat-recoverable. In this case, the film may be formed from a material that has a very low modulus so that it is soft over a large temperature range below the recovery temperature, although it is preferable for the film to become soft only at elevated temperatures so that, at ambient temperatures the coated surface is dry and non-tacky. Thus, while the film is adhesive-receptive, i.e. it will provide a substrate for the formation of a good adhesive bond, it should not itself adhere to any other substrate that is not an adhesive.

Any cross-linkable polymeric material to which the property of dimensional recoverability may be imparted such as those disclosed in U.K. Specification No. 990,235 may be used to form the articles. Polymers which may be used in the polymeric material include polyolefins such as polyethylene and polypropylene, and ethylene copolymers for example with propylene, butene, vinyl acetate or ethyl acrylate, polyamides, polyurethanes, polyvinyl chloride, polyvinylidine fluoride, elastomeric materials such as those disclosed in U.K. Specification Nos. 1,284,082 and 1,294,665, and compositions such as those disclosed in our co-pending U.K. Applications Nos. 15122/77 and 37468/78. Especially suitable polymeric materials are those based on ethylene polymers e.g. polyethylene especially linear low density ethylene polymers such as those described in U.K. Patent Specification No. 2,019,412 and polymers based on segmented poly ether-ester block copolymers such as copolymers having poly-(tetramethylene ether terephthalate) and poly-(polytetramethylene ether terephthalate) blocks. The polyether-ester block copolymers may advantageously be used alone or blended with an elastomer, for example an elastomer based on a terpolymer of ethylene, methyl acrylate and a cure site monomer comprising carboxyl groups which is available from DuPont under the trade name "Vamac". The polymeric materials can be tailored to suit the intended use by the addition of fillers, e.g. semiconducting fillers, flame retardants, plasticisers, pigments, stabilisers and lubricants.

The article may be any dimensionally-recoverable article that is designed to be recovered about an object and bonded to it or to any other article (whether provided before or after recovery thereof), although it is preferably an article that is designed to be recovered about electrical equipment and especially in the production of electrical harnesses. The article may be provided with the film on its inner or outer surface or both as appropriate. For example, where the article is a tube over which one or more other articles are recovered, it will be appropriate for the outer surface thereof to be coated. Where the article is a moulded article, it will be appropriate for the inner surface thereof to be provided with the film, at least in the region of the outlet or outlets.

According to another aspect the invention provides a method of enclosing at least part of an object in an article, at least part of which is dimensionally-recoverable to form an arrangement in which a recovered portion of the article is bonded to another surface, which comprises recovering the article about the object, the article having bonded to the surface of a dimensionally-recoverable portion thereof, a pliant, adhesive-receptive polymeric film which is soft at the temperature at which the dimensionally-recoverable portion is recovered, and which is substantially non-curable at ambient temperatures, providing an adhesive between the dimensionally-recoverable portion and the said other surface either before or after recovery as appropriate, and bring together the said portion and other surface to form an adhesive bond.

If the dimensionally-recoverable article is in the form of a tube over which another article is to be bonded, the tube will be recovered before the adhesive is provided and the other surface brought into contact. If the article is, for example, a moulded article in which the dimensionally-recoverable portion is coated on its inner surface, the adhesive will be applied to one or both the surfaces to be bonded before recovery and the surfaces will be brought together to form the bond by recovery of the dimensionally-recoverable portion.

Although articles formed from the above polymeric materials will often have surfaces of very low polarity, especially where they are formed from polyolefins, it is nevertheless possible, under controlled conditions, to form bonds that are stronger than the polymeric material itself so that the bonds would fail due to cohesive failure of the polymeric material forming the article rather than by failure at the interface of the polymeric material and the adhesive. However, the formation of an adequate bond requires thorough surface preparation by the assembly operator, including abrasion and solvent degreasing, and this is often incompletely performed. More rigorous methods of surface preparation such as abrasion, vapour degreasing, chromic acid etching and the use of a corona discharge cannot conveniently be used in the customers' plant and, whilst these techniques may be used during manufacture of the articles, we have found that the quality of the surfaces deteriorates rapidly during storage, particularly the surfaces of heat-recoverable articles. The reduction in surface quality is apparently due to the migration to the surface of low molecular weight species in the polymeric material, for example, low molecular weight fractions of the base polymer, mould release agents, antioxidants and low molecular weight polymeric components formed by chain-scission during the cross-linking and processing steps.

The present invention has the advantage that it eliminates the need for surface preparation to be performed by the customer, or, at least, reduces the surface preparation to relatively simple operations such as wiping the surface to remove dust etc., with the result that the quality of the adhesive bonds to the articles is largely independent of the assembly operator. The surface of the polymeric material may be prepared under controlled conditions in the manufacturing plant prior to application of the film, and the resulting surface will not deteriorate, or will only deteriorate very slowly, during storage because migration of the low molecular weight species to the surface to be bonded is greatly reduced. Also, in a number of cases, the adhesion of recently manufactured articles to the adhesive may be significantly greater than that obtained with uncoated articles, even when thoroughly cleaned, with the result that the storage life of such articles may be further increased without the subsequent bonds having unacceptably low strengths.

It is important that the film be pliant at ambient temperatures. This is necessary because the polymeric articles are usually deformable to a large extent and the film must be able to accommodate any deformation of the article during storage or installation without straining the polymeric material/coating material interface. If the film is too rigid or inflexible, there is a danger that parts of the film may crack or flake off and allow the surface to deteriorate, or, even if it does not flake off, any stress occurring at the interface will substantially reduce the strength of the resulting bond. In addition, the film must soften at or below the recovery temperature of the polymeric material in order to remain intact during contraction of the surface. In many dimensionally-recoverable articles, and especially dimensionally-recoverable moulded articles, the part of the article that is coated with the film will contract in one direction to one third or less of its original dimensions, often to one fifth or less of its original dimensions, and the film must contract with the surface without straining itself or the coating material/polymeric material interface. The pliancy of the film will depend on the tensile modulus and tensile strength of the coating material used and those having tensile modulus and tensile strength values within the ranges quoted below will have the required pliancy.

Furthermore, in contrast to the majority of previously proposed surface coating materials the film is substantially non-curable at ambient temperatures, preferably up to 30° C. and especially up to 40° C. Whether or not a film is substantially non-curable at any temperature may be determined by measuring the viscosity of the film material, for example by means of a Monsanto Rheometer. For a "non-curable" film, the viscosity does not increase by more than 50%, preferably by not more than 25% over a period of two years at the relevant temperature. The viscosity increase at such temperatures may be determined by measuring the viscosity increase at a number of higher temperatures over shorter periods of time and extrapolating to a period of 2 years on the basis of the Arrhenius equation. It is necessary that the film is substantially non-curable at ambient temperatures in order that the film retains its pliancy, and softens at the recovery temperature of the article even after the article has been stored for long periods, for example periods of up to two years, before it is used.

Although the film is substantially non-curable at ambient temperatures, it advantageously includes a latent thermal curing agent or system which will initiate curing of the film at the recovery temperature of the article. Curing of the film has the advantage that it allows high bond strengths to the polymeric material and increases the solvent resistance of the film. For latent curing films, the film preferably has a bond strength (in the peel mode) to the polymeric material after curing of at least 50, especially at least 100 and most especially at least 200 N/25 mm. The bond strengths will, in the most preferred cases, exceed the cohesive strength of the polymeric material. Before curing, however, the film need only adhere to the polymeric material with sufficient strength to prevent it being removed by normal handling such as wiping the surface or application of adhesive, and bond strengths of at least 12 N/25 mm will be sufficient. Although the pliancy of the film may be somewhat reduced after curing, this can usually be accepted because, after the article has been recovered onto, and bonded to, the substrate, the film is subject to distortion to a much lesser extent. The degree of pliancy required will, of course, depend on the intended use of the article, and the film must still allow some distortion of the adhesive bond, for example if it is used in an electrical harness which will be flexed.

For the coating to adhere to the polymeric material of the article, there should be a similarity of surface energy or polarity of the coating material and the polymeric material since it is difficult to obtain a good bond between a highly polar or high surface energy coating and a non-polar or low surface energy substrate and vice versa. Advantageously the coating has a surface energy that differs from the surface energy of the polymeric material by not more than $\pm 7.5$ preferably not more than $\pm 5$ and especially not more than $\pm 3$ $nNm^{-1}$. The surface energy or polarity can be determined by the methods described by D. H. Kaeble in J. Adh. 66 (1970) or by W. A. Zisman in Advances in Chemistry, Series 43 (ACS Washington D.C. 1964).

The polymeric materials used for the dimensionally-recoverable articles are most often based on polyolefins which, as mentioned above, have low polarity or surface energy, for example in the order of 28 to 34 $mNm^{-1}$, and in many applications the most suitable adhesives to be used with these articles are epoxy adhesives which usually have a surface energy in the order of 38 to 42 $mNm^{-1}$. It is thus most advantageous for the coating material to have a surface energy that is equal to that of the polymeric material of the article or exceeds it by up to 5 $mNm^{-1}$, preferably up to 3 $mNm^{-1}$.

In addition, because the film will be heated during recovery of a heat-recoverable article, it is highly desirable for it not to contain significant quantities of toxic or noxious volatile components which may be released during recovery of the article.

Preferred coating materials have a hardness before curing of from 20 to 90, especially from 40 to 70, and most especially from 40 to 50 IHRD, and after curing of from 40 to 95, especially from 50 to 80, and most especially from 50 to 60 IHRD; a 100% tensile modulus before curing of at least 0.1, more preferably at least 0.5 and most preferably 1 MPa but preferably not more than 20, more preferably not more than 10 MPa, and after curing of from 1 to 200, especially from 3 to 20 MPa; a tensile strength before curing of from 1 to 100, especially from 1 to 10 MPa and after curing of from 1 to 100 preferably 5 to 100, especially 5 to 15 MPa; and an elongation at break before and after curing of from 50 to 1000, especially from 100 to 500%. The softening point of the film will depend on the recovery temperature of the article, and will usually be in the range of from 50° to 200° C., preferably from 100° to 150° C., (all these properties being measured in accordance with BS903).

Coating materials that may be used for films in accordance with the invention include those based on chlorinated polyethylene, chlorosulphonated polyethylenes and blends thereof with chlorinated paraffins, polychloroprene and polyisoprene; chlorinated natural rubber; blends of chlorosulphonated polyethylene with chlorinated natural rubber; ethylene-propylene rubbers (both saturated and unsaturated and including terpolymers and higher copolymers); chlorinated ethylene-propylene rubbers; copolymers of hexafluoro-propylene and vinylidine fluoride, amino silanes and peroxy silanes; polychloroprenes; chlorinated butyl rubber; ethylene-methyl acrylate copolymers; epichlorohydrin rubbers and copolymers of epichlorohydrin with ethylene oxide; polyurethanes preferably polyurethane rubbers based on 4,4'-diphenylmethane diisocyanate or 1,5-naphthalene diisocyanate and hydroxyl terminated polyesters or polyethers; and epoxy resins such as those based on diglycidyl ether of bisphenol A and polyamides based on dimer acids. The above materials will, in almost all cases, need to be compounded with plasticers, resins and other components to form materials having the required flexibility and other physical properties, and must not contain agents that would cure the materials at ambient temperatures. As examples of plasticisers which are especially suitable for films based on chlorosulphonated polyethylenes and chlorinated natural rubber, there may be mentioned paraffin waxes, mineral plasticers, phthalate plasticisers, butyl oleate and other ester type plasticisers, chlorinated paraffins, polychloroprene and polyisoprene.

Preferred film materials are film forming chlorinated resins, for example the chlorinated resins described above, and film-forming silanes, especially preferred films being based on chlorinated polyethylene chlorosulphonated polyethylene, peroxy and amino silanes and chlorinated natural rubbers.

Where the dimensionally-recoverable article is formed from a polymeric material based on polyethylene, especially a linear low density polyethylene, or a polyethylene/ethylene-vinyl acetate copolymer blend, and is to be used with an epoxy resin adhesive, especially one based on diglycidyl ether of bisphenol A, the article is preferably coated with a film based on chlorosulphonated polyethylene and especially blend C of Example 1 below. If the dimensionally-recoverable article is formed from a polymeric material based on a silicone rubber, for example a blend of a silicone rubber and polyvinylidine fluoride, an adhesive based on a curable silicone rubber is preferably used and the coating material is preferably based on an amino silane.

In addition to plasticisers, and other components e.g. antioxidants, stabilizers etc., the materials advantageously contain a latent thermal curing system or agent if they are not inherently curable, for example epoxy resins, metal oxide systems such as magnesium oxide, zinc oxide, or lead II oxide, amine curing systems, or mercaptobenzothiazole disulphide (MBTS).

The film may be applied to the prepared surface of the article using known techniques for example by dip coating from solution or spray coating e.g. electrostatic spray coating methods. The film material is preferably applied so as to form a film having a thickness in the range of from 1 to 250, preferably from 10 to 100, especially not more than 75 micrometers and most especially from 10 to 50 micrometers.

Dimensionally heat recoverable articles according to the invention may therefore be produced by forming an article of polymeric material in the desired configuration, deforming the article into another configuration so that it is dimensionally heat-recoverable, for example due to the formation of cross-links in the material, preparing the surface of a dimensionally-recoverable portion of the article, for example by vapour degreasing, abrasion, acid etching, corona discharge or ultrasonic degreasing or by two or more such methods, and applying a coating material as defined above to form a film on the prepared surface.

The invention will now be described by way of example with reference to the accompanying drawings in which:

FIG. 1 shows a harness and some articles according to the invention before and during recovery; and FIG. 2 shows the completed harness.

Referring to the accompanying drawings, a harness in a "Y" configuration is formed from a bundle of wires 1 that have been laid together in the desired configuration and have been connected to connectors 2, 3 and 4. A heat-shrinkable tube 5 according to the invention is cut so that its length is substantially equal to the length of one of the arms of the harness. The tube 5 is placed over the arm and recovered onto the wires as shown in FIG. 1 by means of a hot air gun (indicated by the arrow H). The tube is provided with an adhesive receptive film over its entire outer surface in order to allow moulded heat-recoverable articles to be recovered over it and bonded to it.

After heat-shrinkable tubes have been recovered over all the arms of the harness, an epoxy adhesive (not shown) is applied around the end of the tube 5 next to the connector 2. A heat-shrinkable moulded article or "boot" 6 according to the invention is then positioned over the connector 2 and the end of the tube 5 and is recovered thereon by heating with a hot-air gun. The entire inner surface of the boot 6 is coated with an adhesive receptive film in accordance with the invention so that no preparation of the inner surface thereof, other than lightly wiping it to remove dust, is required before recovery. The epoxy adhesive may also, if desired, be applied to the connector 2 to seal the wire bundle completely from ingress of moisture.

After the boot 6 has been recovered onto the harness, epoxy adhesive is applied to the ends of the tubes 5 at the branch-out 7 of the harness, and a further moulded article or "transition" 8 is recovered over the branch-out 7 so that each outlet overlies the end of one of the tubes 5. The transition 8 is also coated on its inner surface with an adhesive-receptive film in accordance with the invention.

This operation is repeated with further boots of appropriate shape to form the completed harness as shown in FIG. 2.

The following examples illustrate the invention:

EXAMPLE 1

Four coating materials A to D were prepared by blending the following components:

|  | (Parts by weight) | | | |
| --- | --- | --- | --- | --- |
|  | A | B | C | D |
| Chlorosulphated polyethylene (Hypalon 45 sold by DuPont) | 100 | 100 | 100 | 100 |
| Chlorinated paraffin (Ceraclor 42 sold by ICI) | 25 | 50 | 75 | 50 |
| Chlorinated paraffin (Ceraclor 70) | 25 | 50 | 75 | 50 |
| Zinc Oxide | 5 | 5 | 5 | 5 |
| Magnesium Oxide | 3 | 3 | 3 | 3 |
| Carbon black | 10 | 10 | 10 | 10 |
| Epoxy resin (Epikote 1004 sold by Shell) | 20 | 20 | 20 | 20 |
| Silane (Z6030 sold by Dow Corning) | 5 | 5 | 5 | 5 |
| MBTS (sold by Monsanto Chemicals) | — | — | — | 2 |

The blended materials had the following bulk properties:

|  | A | B | C | D |
| --- | --- | --- | --- | --- |
| Uncured Properties |  |  |  |  |
| Tensile Strength (MPa) | 9.4 | 8.9 | 6.4 | 8.7 |
| Elongation (%) | 600 | 900 | 1000 | 900 |
| 100% Tensile Modulus (MPa) | 2.8 | 2.3 | 1.2 | 2.4 |
| Hardness (IRHD) | 70 | 60 | 50 | 60 |
| Softening Point (°C.) | 140 | 125 | 100 | 125 |
| Cured Properties |  |  |  |  |
| Tensile Strength (MPa) | 9.5 | 9.4 | 6.1 | 11.1 |
| Elongation (%) | 250 | 500 | 800 | 400 |
| 100% tensile Modulus (MPa) | 4.7 | 3.4 | 2.0 | 2.8 |
| Hardness (IRHD) | 70 | 65 | 50 | 70 |

The materials, which had a measured surface energy of 35 mNm$^{-1}$, were dip coated from a solution in trichloroethane onto heat-shrinkable moulded articles sold by Raychem and formed from a polyethylene based polymeric material (Raychem type No. −25 material having a surface energy of 31–33 mNm$^{-1}$).

Peel strengths of bonds between two sets of the moulded articles and aluminium using Raychem S1125 two component epoxy adhesive were measured. One set of articles had been recently provided with the film while the other set had been aged for 5000 hours at room temperature after application of the film. The following peel strengths were obtained:

|  | Peel Strength (N/25 mm) | | | |
| --- | --- | --- | --- | --- |
|  | A | B | C | D |
| New Articles | 75 | >250 | 150 | >250 |
| Aged Articles | 100 | >250 | 175 | >250 |

The peel strengths were determined by cutting a 25 mm wide strip of the article, applying Raychem S1125 epoxy resin adhesive to the film surface and wrapping the strip around an aluminium test drum of 25 mm diameter and 25 mm axial length that had previously cleaned and degreased. The strip was recovered and then left for 24 hours at room temperature to complete curing of the epoxy adhesive.

After the adhesive had cured for 24 hours, the drum was mounted with its axis horizontal so that it was freely rotatable. The strip was pulled off at a rate of 50±5 mm per minute and the force required to pull the strip off was recorded as the peel strength.

EXAMPLE 2

Four coating compositions E to H were prepared by blending the following components:

|  | (Parts by weight) | | | |
|---|---|---|---|---|
|  | E | F | G | H |
| Chlorinated rubber (Alloprene sold by I.C.I.) | 100 | 100 | 100 | 100 |
| Chlorinated paraffin (Ceraclor 42) | 25 | 50 | 75 | — |
| Epoxy resin (Epikote 1004) | 5 | 5 | 5 | 5 |
| Polychloroprene (Neoprene AC - sold by DuPont) | — | — | — | 100 |
| Zinc Oxide | — | — | — | 5 |
| MBTS | — | — | — | 2 |
| Magnesium Oxide | — | — | — | 3 |
| Silane (Z6030 - Dow Corning) | 5 | 5 | 5 | 5 |

The compositions had the following bulk properties:

|  | E | F | G | H |
|---|---|---|---|---|
| Uncured |  |  |  |  |
| Tensile Strength (MPa) | 32 | 18 | 16 | 22 |
| Elongation (%) | 60 | 100 | 200 | 500 |
| 100% Tensile Modulus (MPa) | 25 | 20 | 8 | 10 |
| Hardness (IRHD) | 90 | 80 | 70 | 65 |
| Softening Point (°C.) | 160 | 150 | 130 | 140 |
| Cured |  |  |  |  |
| Tensile Strength (MPa) | 25 | 17 | 17 | 28 |
| Elongation (%) | 50 | 70 | 150 | 400 |
| 100% Tensile Modulus (MPa) | 50 | 45 | 12 | 12 |
| Hardness (IRHD) | 90 | 85 | 75 | 65 |

The compositions which had a measured surface energy of 35 mNm$^{-1}$ were dip coated from a solution in trichloroethane onto heat-shrinkable moulded articles formed from Raychem −25 polymeric material, and the peel strength using S1125 adhesive was determined as in Example 1. The following peel strengths were obtained:

|  | E | F | G | H |
|---|---|---|---|---|
| Initial (not aged) peel strength (N/25mm) | 25 | 25 | 25 | 250 |

EXAMPLE 3

Heat-shrinkable moulded articles formed from a number of polymeric materials were provided with a silane film (surface energy approx. 28 mNm$^{-1}$) which was applied from an ethanolic solution by a dip coating method.

Two silanes were used, namely:
(J) Vinyl tris(tert butylperoxy)silane CH$_2$=CH—Si$+$O—O—C(CH$_3$)$_3$]$_3$ and
(K) γ-aminopropyl triethoxy silane H$_2$N(CH$_2$)$_3$Si(OC$_2$H$_5$)$_3$ The peel strengths of the articles bonded to aluminium by S1125 epoxy adhesive were determined as in Example 1. The following results were obtained:

| Silane | Peel Strengths (N/25mm) | | |
|---|---|---|---|
|  | Polymeric Material | | |
|  | Polyolefin (−25) | Silicone (−6) | Fluorocarbon (−12) |
| J | >250 | >125 |  |
| J (Aged 5000 hrs) | 200 | >125 |  |
| K | >250 | >125 | >200 |
| K (Aged 5000 hrs) | >225 | 125 | >200 |

The surface energies of the polymeric materials were:
Polyolefin (−25) 31-33 mNm$^{-1}$
Silicone (−6) 26-28 mNm$^{-1}$
Fluorocarbon (−12) not measured.

I claim:
1. A polymeric article, at least part of which is dimensionally heat-recoverable, and has, coated on the surface of a dimensionally-recoverable portion thereof, a pliant, adhesive-receptive polymeric coating which softens at an elevated temperature of up to the recovery temperature of the article, which has no intrinsically adhesive properties, which is substantially non-curable at ambient temperatures and which includes a thermal curing agent which initiates curing of the coating of the recovery temperature of the article.

2. An article as claimed in claim 1, wherein the polymeric film has a viscosity that does not increase by more than 25% of its initial viscosity over a period of 2 years at 30° C.

3. An article as claimed in claims 1 or 2, wherein the polymeric film has an initial hardness in the range of from 40 to 70 IHRD.

4. An article as claimed in claims 1 or 2, wherein the polymeric film has an initial tensile modulus in the range of from 1 to 10 MPa.

5. An article as claimed in claims 1 or 2, wherein the polymeric film has an initial tensile strength in the range of from 1 to 10 MPa.

6. An article as claimed in claim 1, wherein the polymeric film and the dimensionally-recoverable portion of the polymeric article have surface energies that differ from each other by not more than 7.5 mNm$^{-1}$.

7. An article as claimed in claim 6, wherein the surface energies differ from one another by not more than 5 mNm$^{-1}$.

8. An article as claimed in claim 7, wherein the surface energies differ from one another by not more than 3 mNm$^{-1}$.

9. An article as claimed in claim 1, wherein the polymeric film has a thickness in the range of from 1 to 250 micrometers.

10. An article as claimed in claim 9, wherein the film thickness is in the range of from 10 to 100 micrometers.

11. An article as claimed in 1 or 3, wherein the polymeric film comprises a film-forming chlorinated resin or a film-forming silane.

12. An article as claimed in claims 1 or 2, wherein the polymeric film comprises a film-forming chlorinated resin.

13. An article as claimed in claims 1 or 2, wherein the polymeric film comprises a chlorinated polyethylene, a chlorosulphonated polyethylene or a chlorinated natural rubber.

14. An article as claimed in claim 1, which is a hollow article and has the polymeric film bonded to an inner surface thereof.

15. An article as claimed in claim 14, wherein the polymeric article has been formed by moulding.

16. An article as claimed in claims 1 or 2, wherein the dimensionally-recoverable portion will contract to one third or less of its original dimensions on recovery of the article.

17. An article as claimed in claims 1 or 2, which has been formed from a material comprising an ethylene homo- or copolymer.

* * * * *